United States Patent

Diamond

[15] 3,639,851

[45] Feb. 1, 1972

[54] NOVEL SEMICONDUCTOR AMPLIFIER

[72] Inventor: Felix Diamond, Paris, France

[73] Assignee: Thomson-CSF

[22] Filed: June 26, 1969

[21] Appl. No.: 836,784

[52] U.S. Cl. .......... 330/38 M, 330/12

[51] Int. Cl. .......... H03f 3/14

[58] Field of Search .......... 330/12, 5.5; 333/30; 315/3, 315/3.5

[56] References Cited

UNITED STATES PATENTS 3,158,819 11/1964 Tier .......... 330/35

3,270,241 8/1966 Vural .......... 315/3

3,388,334 6/1968 Adler .......... 330/5.5

*Primary Examiner*—Nathan Kaufman

*Attorney*—Cushman, Darby & Cushman

[57] ABSTRACT

The present invention invention relates to a semiconductor-type travelling wave structure. A thin extrinsic semiconductor strip is located in the field of a delay line; a continuous field is applied between the two ends of the strip; the line has an HF input and an HF output.

5 Claims, 4 Drawing Figures

PATENTED FEB 1 1972 3,639,851

SHEET 1 OF 2

NOVEL SEMICONDUCTOR AMPLIFIER

The present invention relates to semiconductor amplifiers.

Semiconductors have already been employed in a variety of amplifier systems, in which they advantageously replace electronic tubes. However, hitherto, the gains achieved, the passbands and the output power have been rather limited.

It is an object of this invention to provide a novel semiconductor amplifier which makes it possible to achieve high gains, with wide passbands and high output powers.

According to the invention there is provided an ultrahigh-frequency amplifier device comprising in combination: a thin film of a semiconductive material, having two large sides and two ends; means for applying between said two ends a predetermined DC voltage, for creating in said film an electric field parallel to said two large sides, for imparting to the free carriers in said film a predetermined velocity; a delay line extending parallel to said film, from one end to the other; said delay line having an input and an output for high-frequency energy, said delay line being tightly coupled to said film.

For a better understanding of the invention, reference will be made to the drawing accompanying the ensuing description and in which.

Figure 1:
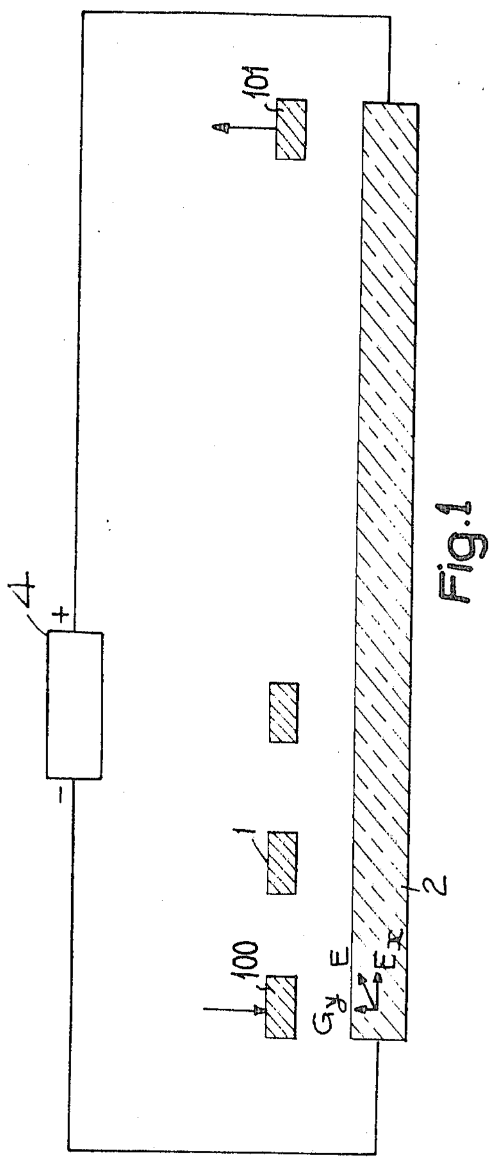
FIG. 1 is a diagram explaining the principle of the device according to the invention.

In FIG. 1, a delay line 1 having an ultrahigh-frequency wave input 100 and an output 101 is coupled to a thin semiconductor film 2. A source 4 provides a potential difference U across the terminals of the semiconductor 2. In the following, it will be assumed that the conductor is of the N type, although this is in no way limitative of the scope of the invention. The field $E_c$ created within the film 2 is such that the free carriers move with a velocity of the same magnitude order as the phase velocity of the energy within the line.

The line may be either of the forward wave or backward wave type and its coupling to the film 2 is tight.

Figure 2:
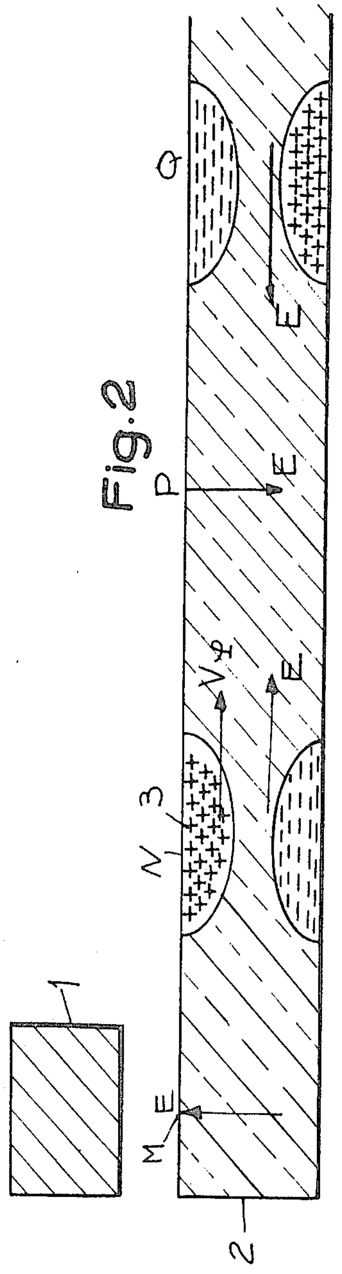
FIG. 2 is an explanatory diagram.

The principle of operation of the arrangement will be understood from a consideration of FIG. 2, which is an enlarged view of the input end of the film 2.

It may be shown that the electric field, created within the film 2 by the fundamental space harmonic of the line 1, has an elliptical polarization in the plane of the longitudinal section of the strip 2.

At a given time $t$ and at a point M on the surface of the semiconductor, the transverse component $\vec{Ey}$ of said field (direction perpendicular to the strip 2) is at a maximum. It excites within the strip 2 a transverse current, which leads to the bunching of free charge carriers in the neighborhood of the upper and lower surfaces of the strip (within a thickness in the order of magnitude of the Debye length). The density of the charge bunches 3 varies in quadrature with the transverse component $\vec{Ey}$ of the field E. This density will be maximum at a point N spaced from M, by the distance NM equal to $\gamma_r/4$, where $\gamma_r$ is the wavelength in the delay line.

The density is at a maximum at the locations where the transverse field $\vec{Ey}$ is zero and where the longitudinal field $\vec{Ex}$ is at a maximum. The charge bunches propagate with the apparent or phase velocity $V_\varphi$ of the ultrahigh-frequency wave in the line.

However, all the charge carriers considered as such, disregarding the bunching thereof, have the same velocity which is the velocity $V_o$ due to the DC field $E_c$. This velocity of the charge carriers is independent of any ultrahigh-frequency field which results in the bunching thereof.

This bunching results is the fact that a superficial current is developed, which is in phase quadrature with the transverse component $\vec{Ey}$ of the ultrahigh-frequency field, and therefore in phase or in antiphase with the longitudinal component $\vec{Ex}$ of this field.

The interaction between the bunches and the ultrahigh-frequency field results in an attenuation of the wave, in the former case and an amplification in the latter case.

It can be shown that there is amplification, that is to say, energy transfer, from the charge carrier bunches to the ultrahigh-frequency field, in the following cases:

1. For $V_o > V_\varphi$, if the differential mobility is positive;
2. For $V_o < V_\varphi$, if the differential mobility is negative.

The differential mobility of a semiconductor is the slope of the curve $V_o = f(E_c)$ (I is the current, $E_c$ the applied field).

In the first instance, it is desirable that $V_o$ should be very large (close to the upper limit velocity in semiconductor) in order to achieve the condition $V_o > V_\varphi$ with a delay line having feasible dimensions. This condition requires the use of a semiconductor substances having a very high mobility (InSb).

The second case applies to certain materials which, for an applied field whose strength exceeds a certain "critical field strength," exhibit a negative differential mobility (e.g., gallium arsenide, GaAs).

It may be shown that in these two cases, the thickness $e$ of the semiconductor layer should be small compared with the delayed wavelength $\gamma_r$ in the line. It should be longer than the Debye length, $\rho_D$.

In practice, this thickness will be substantially larger than the Debye length, because of technological considerations associated with manufacturing techniques.

Figure 4:
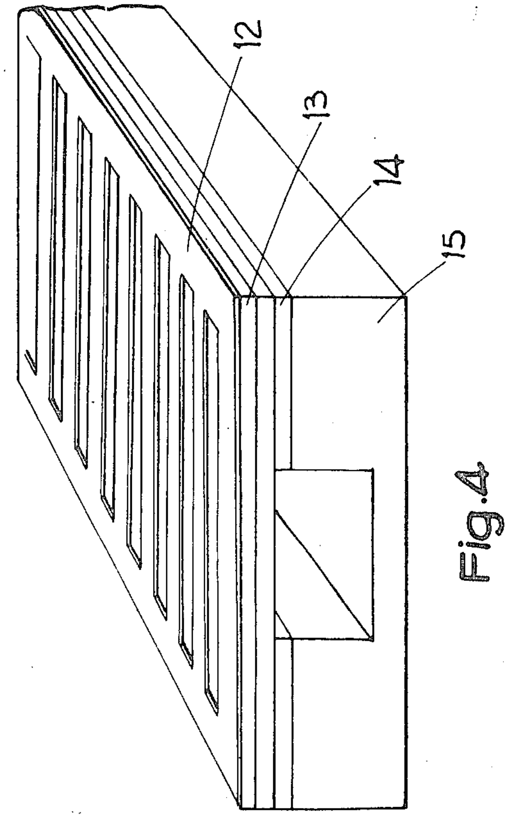
FIG. 4 is a perspective view of part of the embodiment shown in FIG. 3.
Figure 3:
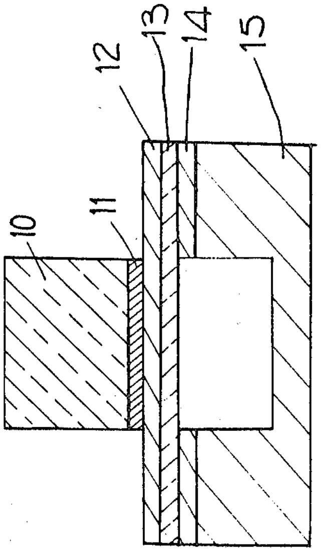
FIG. 3 is a sectional view of one embodiment of the invention.

FIG. 3 is a transverse section of one embodiment of the invention, and FIG. 4 is a perspective view of certain elements of the arrangement shown in FIG. 3.

In these figures, a semiconductor layer 11 applied to a substrate 10, can be seen. The semiconductor layer 11 is, for example, gallium arsenide, and the substrate 10 is semiinsulating gallium arsenide, upon which the active layer is deposited by epitaxial techniques.

The delay line 13 is, for example, of the ladder type. It is deposited by photoengraving techniques, upon an insulating substrate 12 (for example, of mica or Mylar) which is in contact with the layer 11. The line 13 will be provided on its opposite face with an insulating layer 14. The whole of this arrangement is deposited upon a copper parallelepiped body 15 comprising a central recess and forming the base of the ladder-type delay line.

By way of example, for operation in the S-band, the pitch of the line will be in the order of 70$\mu$ in the case of a semiconductor of the above-mentioned type (1) (InSb) and greater in the case of the semiconductors of the above-mentioned type (2) (GaAs).

The whole of the structure is 3 mm. long and the DC voltage is in the order of 1,000 volts.

What is claimed is:

1. An ultrahigh-frequency amplifier device comprising in combination: a thin film of semiconductive material, having two large sides and two ends; means for applying between said two ends a predetermined DC voltage for creating in said film an electric field parallel to said large sides, for imparting to the free carriers in said film, a predetermined velocity; a delay line extending parallel to said film, and insulated therefrom, from one end to the other, said delay line having an input and an output for electromagnetic ultrahigh-frequency energy, and for propagating an ultrahigh-frequency electromagnetic wave; said delay line being tightly coupled to said film.

2. An amplifier as claimed in claim 1, wherein said semiconductive material has a predetermined type of conductivity.

3. An amplifier as claimed in claim 1, wherein the differential mobility of said free carries in said semiconductive material is positive, and said phase velocity in said delay line is lower than said free-carriers velocity.

4. An amplifier as claimed in claim 1, wherein the differential mobility of said free carries in said semiconductive material is negative, and said phase velocity in said delay line is higher than said free-carriers velocity.

5. An amplifier as claimed in claim 1, wherein said delay line of the ladder type.